United States Patent [19]

Meltzer

[11] 4,453,209

[45] Jun. 5, 1984

[54] SYSTEM FOR OPTIMIZING PERFORMANCE OF PAGING STORE

[75] Inventor: David Meltzer, Wappingers Falls, N.Y.

[73] Assignee: International Business Machines Corporation, Armonk, N.Y.

[21] Appl. No.: 133,233

[22] Filed: Mar. 24, 1980

[51] Int. Cl.³ .................... G06F 13/00; G06F 13/08
[52] U.S. Cl. .................................................. 364/200
[58] Field of Search ............................. 364/200, 900

[56] References Cited

U.S. PATENT DOCUMENTS

| | | | |
|---|---|---|---|
| 2,840,304 | 6/1958 | Williams et al. | 235/61 |
| 2,913,706 | 11/1959 | Thorensen et al. | 340/174 |
| 3,303,476 | 2/1967 | Moyer | 340/172.5 |
| 3,336,582 | 8/1967 | Beausoleil | 340/172.5 |
| 3,341,817 | 9/1967 | Smeltzer | 340/172.5 |
| 3,400,371 | 9/1968 | Amdahl et al. | 340/172.5 |
| 3,488,633 | 1/1970 | King et al. | 340/172.5 |
| 3,654,622 | 4/1972 | Beausoleil | 340/172.5 |

OTHER PUBLICATIONS

IBM Technical Disclosure Bulletin, vol. 13, No. 1, Jun. 1970, Transparent Roll Mode for Rotating Device, D. A. Stevenson.

*Primary Examiner*—Felix D. Gruber
*Assistant Examiner*—John G. Mills
*Attorney, Agent, or Firm*—R. Lieber

[57] ABSTRACT

Operations to prepare a secondary paging store for a data transfer relative to a central processor main store are overlapped in time with chaining operations of an input-output channel relative to the main store for preparing a command defining the transfer operation. In a preferred embodiment the paging store is organized for sequential access to page records and the operations to prepare the paging store include a calculation of a "roll mode" displacement factor which defines a randomly chosen displacement position in a designated page area for beginning the transfer with minimized latency. This factor is calculated as a function of channel operational characteristics as well as the bit timing rate of the paging store. The displacement calculation is also adapted for a paging store having different timing rates for transferring data and regenerating stored data. The displacement factor is stored in a buffer register and conditionally transferred to the channel when the channel next selects the paging store in association with the chained command. The transfer of the displacement factor is conditioned on the timing of the channel selection relative to the accessibility timing of the displacement position. If the selection is late the response to the selection is delayed until a new factor is calculated. Such re-calculations will be relatively infrequent in a system which is not overloaded with channel contention activity.

5 Claims, 8 Drawing Figures

FIG. 1

PRIOR ART

FIG. 2

PRIOR ART

SYSTEM FOR OPTIMIZING PERFORMANCE OF PAGING STORE

BACKGROUND OF THE INVENTION

1. Field Of The Invention

The present invention relates to a system and method for optimizing access to a paging store in a data processing system including a central processing main store. The system is adapted for transferring data between the main store and paging store via an input-output channel and a control unit.

2. Statement Of The Problem

In contemporary data processing systems data transfers, between a main store associated with one or more central processing subsystems and a secondary backing store, are carried out via an input-output (I/O) channel associated with the main store and a control unit associated with the secondary store. Such transfers are controlled by channel command words (CCWs) stored in the main store, and are routed between specified storage areas in the secondary store and main store. These areas are usually specified by plural sequentially chained CCWs; a first such CCW specifying a record location in the secondary store and another CCW chained to the first CCW defining a boundary location of a corresponding area in main store and a transfer operation between the two stores.

In respect to certain secondary stores all such data transfers are conducted in discrete block units of predetermined "page" length (e.g. 4,096 bytes). Such secondary stores are termed "paging stores".

For such transfers the I/O channel requires a predetermined minimum amount of time to execute command chaining operations, for linking the CCW which defines the page location in the paging store to the CCW which defines the other parameters of the transfer operation. This time depends on the direction of the transfer operation and the time required by the channel to obtain access to the main store assuming it is not delayed by contention. The paging store usually exhibits delays, for instance due to latency, which come into play only after the chaining reselection by the channel and are thereby additive in relation to the chaining delay of the channel.

Accordingly, in systems requiring fast access to data in a paging store these delays may severely limit performance. The paging store may be implemented out of high speed electronic components such as charge coupled devices (CCDs). However, even such stores inherently exhibit non-negligible delays due to regeneration activities, and, when organized for sequential access, due to latency.

A known "roll mode" addressing technique (refer for instance to U.S. Pat. Nos. 2,840,304 and 3,341,817 discussed below under "Description of the Prior Art") permits latency delays of such paging stores to be reduced by allowing each transfer to start at a variable position within a page (or block), proceed to an end boundary of the page, link to the beginning of the page, and continue to and terminate at a position immediately preceding the starting position.

However, in conventionally organized systems the operations associated with preparing for such transfers—e.g. validity checking of the page location parameters and establishment of a suitable "roll mode" starting position in the paging store—would be referred in time to a channel signal for starting the transfer of data. Accordingly, even when operating in roll mode, such a system would be limited in performance by the non-negligible delay of the central system channel in preparing the transfer command.

Accordingly the present invention concerns a method and apparatus for substantially reducing the delays associated with preparation for such page transfer operations.

3. Description Of The Prior Art

A co-pending U.S. Pat. application Ser. No. 973,826 filed Dec. 28, 1978 and assigned to the Assignee of the present application entitled "A Command Pair To Improve Performance And Device Independence", describes a method for facilitating exchanges of fixed length data records between a DASD and a CPU. The channel uses a first CCW to transfer information to the control unit defining a multiple record boundary ("extent"), a second CCW to define the location of a specific record storage area in the DASD, and a third CCW to define a counterpart area in CPU main storage and a transfer operation to be conducted between the DASD and main storage areas. The control unit signals the end of the operation associated with the first CCW before its actual completion so that a boundary validation operation in the control unit (associated with the first CCW) is effectively overlapped in time with central system channel operations for preparing the second CCW.

A number of patents and publications describe roll mode operations as characterized above. These include: U.S. Pat. No. 2,840,304 to F. C. Williams, issued June 24, 1958 and assigned to National Research and Development Corp.; U.S. Pat. Nos. 2,925,587 and 2,913,706, both to R. Thorensen et al, assigned to Secretary of Commerce, U.S.A.; U.S. Pat. No. 3,341,817 to J. C. Smeltzer, assigned to Bunker-Ramo Corp.; U.S. Pat. No. 3,654,622 to W. F. Beausoleil et al, assigned to the Assignee of the present application; IBM Technical Disclosure Bulletin Vol. 13, No. 1 June 1970, pages 93–95, "Transparent Roll Mode For Rotating Device" by D. A. Stevenson.

A number of patents disclose central processors, channels and control units of the type generally contemplated herein as environmental elements of a system in which the present invention may be conveniently practiced. These include: U.S. Pat. No. 3,400,371 to G. M. Amdahl et al, issued Sept. 3, 1968 and assigned to the Assignee of the present application, which shows a data processing system having channel facilities; U.S. Pat. No. 3,488,633 to L. E. King et al, issued Jan. 6, 1970, and assigned to the Assignee of the present application, which shows I/O channel apparatus for a data processing system of the type described in said Amdahl et al patent; U.S. Pat. No. 3,303,476 to J. T. Moyer et al, issued Feb. 7, 1967 and assigned to the Assignee of the present application, which shows an I/O control unit which may be used in the system described in said Amdahl et al patent; and U.S. Pat. No. 3,336,582 to W. F. Beausoleil et al, issued Aug. 15, 1967 and assigned to the Assignee of the present invention, which discloses details of a communication interface between a channel and a control unit in a system of the type disclosed in said Amdahl et al patent. The disclosures of said Amdahl et al, King et al, Moyer et al and Beausoleil et al patents are incorporated herein by this reference.

SUMMARY OF THE INVENTION

An object of the present invention is to provide a system for optimizing performance of a data processing system containing a paging store. Another object of the present invention is to provide a system for optimizing performance of a system incorporating a cyclic access paging store.

It is another object of the present invention to provide a system for improving the access time to a cyclic access paging store.

In accordance with the present invention a channel associated with a central processor main store and a control unit associated with a paging store cooperatively execute a pair of commands sequentially related by chaining. These commands, which are defined by channel command words (CCWs)—a LOCATE CCW and a READ or WRITE CCW chained to the LOCATE CCW—are executed sequentially as a time-related unit. The control unit performs operations for speeding up access to the paging store, after the operations associated with the LOCATE CCW have been terminated and while the READ or WRITE CCW is being retrieved from main store by the channel.

During execution of the LOCATE CCW, the channel passes information to the control unit defining a page storage area in the paging store and the direction of an anticipated (i.e. scheduled) transfer operation relative to that area. The control unit stores this information and signals completion of the (LOCATE) command operation. The channel thereupon recognizes command chaining and initiates retrieval and preparation of the following READ or WRITE CCW. While the channel is performing the last-mentioned operations the control unit operates to check the validity of the page address information passed with the LOCATE CCW, and to perform other operations for preparing the operation. In one specifically disclosed embodiment, in which the paging store consists of arrays of charge coupled device (CCD) circuits organized for sequential access, the control unit operates during this "channel chaining" period to calculate a roll mode displacement factor for beginning the transfer operation at a variable position in the page. This calculation is functionally dependent on the direction of the transfer, the minimal timing of channel access to main storage (assuming no interference due to contention), and the rate of operation of the paging store when data is being transferred.

The control unit stores this pre-calculated displacement factor, and if the signalling sequence associated with the READ or WRITE CCW is initiated by the channel before the selected roll mode position becomes accessible at the paging store the control unit responds to the initial selection signal from the channel by passing the displacement factor to the channel. The channel adds the displacement factor to a main storage "page boundary" address defined in the READ or WRITE CCW, and thereby forms an initial address for the transfer which corresponds to the selected roll mode position in the paging store. The operation then proceeds as a "normal" roll mode operation with successive bytes of the page being transferred, beginning at the roll mode position and continuing to the last byte position in the page. At this point the channel effectively distinguishes an "end of page" address and links the operation to a beginning page address (in main storage). At the same time the control unit links automatically to the corresponding page position in paging store due to the cyclic organization of the latter store. The operation then continues with other successive byte transfers and is automatically concluded by the channel when the number of bytes transferred corresponds to the length of a page.

On the other hand if the control unit determines that the selection signalling sequence from the channel for starting a (READ or WRITE) transfer operation has occurred after the roll mode position has become inaccessible the control unit delays its response to the channel selection signal while it calculates another roll mode starting position for the operation. A displacement factor associated with this newly calculated position is passed to the channel in association with a delayed response by the control unit to the channel's selection signal.

A third situation, dealt with in accordance with the subject invention, is when signals presented by the channel to the control unit, after the displacement factor has been transferred to the channel, are late in relation to the real access time of the roll mode entry position associated with that factor. In this case the control unit effectively aborts the operation by signalling for a retry operation. This causes the channel to repeat the retrieval and execution of the READ or WRITE CCW, while the control unit re-calculates a displacement factor to pass to the channel for the rescheduled operation.

It has been determined that in a properly organized system the preponderance of channel chaining operations will be concluded sufficiently early, in relation to the accessibility timing of the precalculated displacement position, to permit the channel and control unit to enter into the transfer operation without any re-calculation or retry delays.

A requirement relative to such displacement factor transactions and roll mode page transfers, is that areas in main storage allocated for such transfers must not be fragmented and must have boundary addresses which are easily distinguishable by the channel. Furthermore, when paging storage is organized for sequential access (e.g. to bytes) the initial (byte) location of any page must become accessible consecutively and in time contiguity after the last (byte) location of the same page.

Accordingly after forming the displacement address, and while transferring groups of successive data bytes relative to appropriate group address portions of the assigned page storage area in main storage, the channel repeatedly increments the address number which it uses as the next group transfer address, until the updated address represents a position on the group unit removed from the lower boundary of the next page storage area. Upon detecting this address position (all ones in six particular bit denominations of the updated address), and after completing the data transfer relative to this "final" group position the channel forces zeroes into particular bit denominations of the register which holds the updated data address term so that the resulting address automatically represents the address of the initial group portion of the assigned page area. At the same time the control unit automatically begins accessing the initial byte position in the corresponding page storage area of the paging store (due to the sequential organization of paging storage as noted above).

During the foregoing byte transfer operations the channel operates in conventional fashion to decrement a "remaining length" count, which is set initially by the (READ or WRITE) CCW at a value corresponding to the length of a page (i.e. 4,096 bytes), and to monitor the value of the updated count. When the count value becomes 0 the channel terminates the operation in accordance with conventional channel and control unit ending procedures.

The foregoing and other objects, features and advantages of the invention may be more fully understood and appreciated by considering the following detailed description and claims in reference to the accompanying drawings.

DETAILED DESCRIPTION OF A PREFERRED EMBODIMENT

Figure 1:
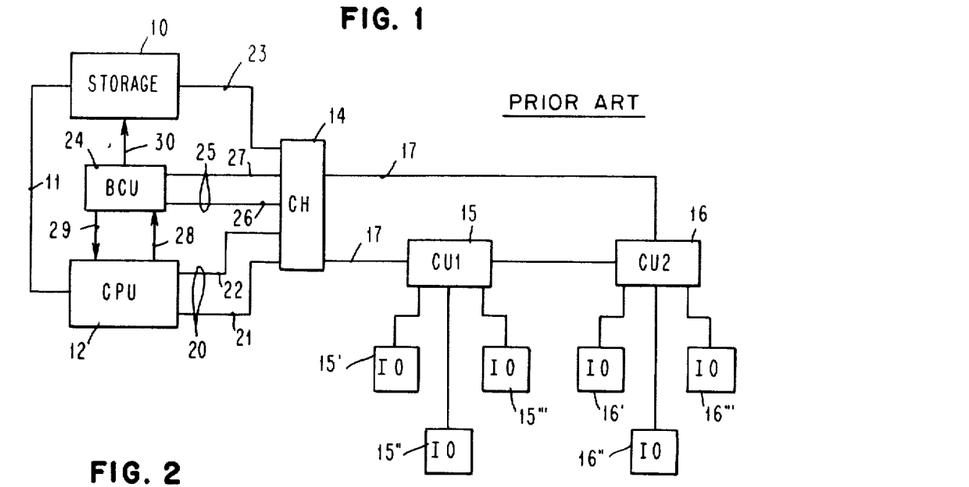
FIG. 1 is a schematic block diagram illustrating a typical prior art information processing system which may be adapted in a simple manner for the practice of the present invention.

FIG. 1 schematically illustrates a data processing system representing an environment conveniently adaptable for the practice of the present invention. This system may include a main storage unit 10 connected through a suitable bus 11 to a central processing unit (CPU) 12. A data channel 14 connects store 10 and CPU 12 with a plurality of control units 15, 16. Each control unit may connect the channel to a plurality of input/output devices 15', 15", . . . , 16', 16", . . . The control units are connected to the channel through an I/O interface bus 17 having multiple lines described below.

A system of this type may have plural CPUs such as 12 and plural channels such as 14. Each channel may have a separate bus such as 17 and a "string" of control units such as 15, 16, each string connecting with sets of devices. Each data channel 14 may be connected to a CPU 12 through a CPU interface 20 including a multiplex bus 22 and a plurality of simplex or single direction lines 21. All data channels connected to the same CPU share a common multiplex bus 22.

Each channel unit is connected to the storage unit 10 by way of a storage interface 23 which may be operated as a multiplex bus by a bus control unit (BCU) 24. A bus control interface 25 comprising a multiplex bus 27 and individual simplex lines 26 interconnects the channel units and BCU 24. The BCU has a storage bus 30, a CPU output bus 28 and a CPU input bus 29. The BCU controls storage accesses of both the CPU and the channel(s).

Figure 2:
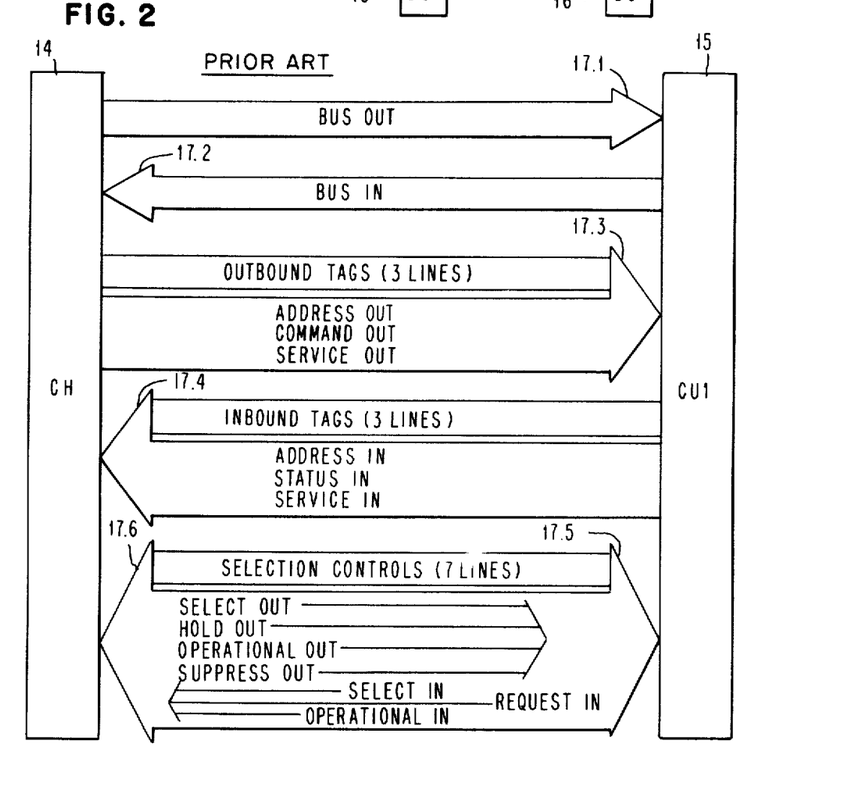
FIG. 2 shows a conventional prior art I/O interface between a channel and a control unit.

FIG. 2 illustrates the I/O interface bus 17 between channel 14 and the "lead" control unit 15 of a string such as 15, 16. The I/O interface includes sets of Bus Out lines 17.1 and Bus In lines 17.2, each set consisting of plural lines, for transferring data and control information in byte (8-bit) serial bit parallel form. The control information includes device addresses and channel command information. Bus 17 also includes sets of 3 outbound tag lines 17.3 and 3 inbound tag lines 17.4 which can be used for distinguishing the type of information carried on respective bus lines 17.1 and 17.2. Signals on these tag lines distinguish command information, address information and data. In addition, the interface includes sets of "outwardly" directed selection control lines 17.5 (Select Out, Hold Out, Operational Out, and Suppress Out) and "inwardly" directed selection control lines 17.6 (Select In, Request In and Operational In). Signals on these selection control lines are used for establishing interlocked signalling relationships between channel 14 and a selected one of the control units 15, 16. Since the structure of the I/O interface bus configuration shown in FIG. 2 is well known in the art, and since the signalling protocols in this configuration are also well known in the art (refer for instance to the above-referenced patents to Beausoleil et al and Moyer et al, and to "IBM System/360 and System/370 I/O Interface Channel To Control Unit Original Equipment Manufacturers' Information" form GA22-6974 available through sales representatives of the International Business Machines Corporation), these lines and protocols are not extensively described herein.

Figure 3:
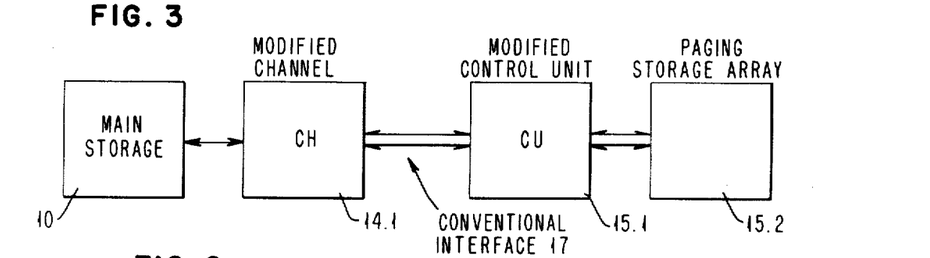
FIG. 3 illustrates a system including a channel and paging store specifically adapted for operation in accordance with the present invention.

A system incorporating a paging store as presently contemplated is suggested in FIG. 3. Such a system comprises a channel 14.1 which is dedicated exclusively to a control unit 15.1 which in turn is dedicated exclusively to a paging store array 15.2. The channel 14.1 and control unit 15.1 communicate via a conventional interface bus 17. For cost/performance effectiveness the storage capacity of array 15.2 should be an order of magnitude greater than the capacity of main storage 10 (FIG. 1), although this is not particularly relevant to the present invention. Not shown in this figure are other channels and control units which would be required in such a system to sustain the operations of other peripheral device elements.

The channel 14.1 and control unit 15.1 require certain logical adaptations, which are believed to be novel, for performing the operations associated with the present invention. These operations include operations by the control unit for speeding up access to the paging store 15.2, overlapped in time with channel operations for chaining to a command defining a data transfer operation, and operations for transferring information from the control unit to the channel relative to the data transfer operation. When such transferred information comprises a roll mode displacement factor the channel adds such factor to the initial main storage address specified in the transfer command (READ or WRITE CCW). During the ensuing transfer this address is progressively incremented. The channel inhibits any carry at a predetermined bit denomination position during such incrementing so that storage references relative to main storage will automatically "wrap" from an end position in a page storage area to an initial byte position in the same area.

The paging store 15.2 is assumed presently to be an array of fast access electronic storage elements, such as charge coupled devices (CCDs), permitting storage of multiple page blocks of data—a page block being presently defined as consisting of 4,096 8-bit bytes—which is organized to permit random access to any page and preferably organized to provide serial cyclic access to bytes within a page. Serial cyclic access is intended presently to mean that if the bytes of a page are numbered from 0 through 4,095 bytes 0 through 4,095 of any page are rendered accessible in the sequence of their numbering, on a cyclic basis, with byte 0 being accessible consecutively after byte 4,095.

For the purpose of the following explanation, it is assumed that all transfers of data to or from the paging storage 15.2 occur in multiples of the basic page length (4,096 bytes). System control programs associated with the scheduling of paging store transfers prepare each page transfer by constructing a channel program consisting of one or more pairs of channel command words (CCWs); each pair consisting of a LOCATE CCW, and a READ CCW or a WRITE CCW linked to the LOCATE CCW by chaining. In a series of such pairs scheduled for sequential execution the LOCATE CCW in each pair other than the first pair in the series may be linked by command chaining to the READ or WRITE CCW of the preceding pair. Accordingly multiple pages can be transferred with a single initiating instruction (i.e. one Start I/O).

Each LOCATE CCW specifies a location of a page storage area in the paging store which is a source or destination object of an associated data transfer. Each READ or WRITE CCW is required to specify the address of a "lower boundary" byte location in an unfragmented 4,096-byte storage area in main storage. This area represents a destination or source of the transfer and must not extend across a boundary address location as defined hereinafter. If not chained to a previous command operation, the operations of such a pair of CCWs are initiated when a system CPU executes a Start I/O instruction addressed to the channel 14.1 and paging store 15.2. This "primes" the channel to retrieve a first LOCATE CCW from a specified command address and to set up a corresponding LOCATE operation in cooperation with control unit 15.1 and paging store 15.2.

As indicated previously channel 14.1 and control unit 15.2 are adapted specifically for executing programs of sequentially paired LOCATE and READ or WRITE CCWs linked by chaining. Such paired CCWs are stored contiguously in main store 10 and retrieved sequentially by the channel from the main store. In such pairs the LOCATE CCW defines the location of a page area in paging store 15.2 which represents the source or destination object of the anticipated transfer, and the READ or WRITE CCW defines the location in main store to which or from which the data is to be transferred, as well as the direction of the transfer and the fixed (page) length of the data to be transferred (i.e. 4,096 bytes). For purposes which will be explained later the LOCATE CCW also refers the control unit to information defining the direction of transfer associated with the following READ or WRITE CCW.

These commands are consistent in length and format with the command structure described in the previously cited reference patents to Amdahl et al and King et al. More specifically, each LOCATE and READ or WRITE CCW is a 64-bit (8-byte) expression in which the first byte defines the operation associated with the command; the next three bytes constitute a "data address" field which defines the initial byte location in a page storage area in main storage to which or from which data or control information is to be transferred; the fifth byte contains control flag information including a command chaining flag bit which indicates whether the respective CCW is or is not chained to another CCW scheduled for subsequent execution; the sixth byte is generally not used; and the seventh and eighth bytes together constitute a "count" field which defines the number of bytes of data or control information to be transferred relative to main storage in association with the respective CCW.

The "data address" and "count" portions of each LOCATE CCW define the location in main storage of a 4-byte "control term" which is to be passed from the channel to the control unit during the execution of that CCW. The first three bytes of this control term are used to define the location in paging store of the page area which is the source or destination object of the data transfer associated with the paired READ or WRITE CCW. The last byte of this control term defines the direction of the associated data transfer (i.e. read or write). As will be shown later this "pre-indication" of direction by the LOCATE CCW is used by the control unit in its "time-overlapped" calculation of the roll mode displacement.

The READ and WRITE CCWs have data address and count fields effectively defining an unfragmented storage area of 4,096 bytes in main storage. The data address defines a lower bound or initial byte location in this area. As suggested previously, a requirement is that this area must not extend across a distinguishable end boundary; in particular a boundary whose address expression consists of all 0's in the twelve lowest order bit positions. This requirement enables the channel to link its address references in roll mode operation from an end or upper boundary address to the appropriate initial or lower boundary address by a single logical operation as described hereinafter.

After being selected in association with a LOCATE CCW, and upon receiving the control term designated by the data address and count fields of that CCW, the control unit 15.1 stores the control term information and signals Device End to the channel 14.1. The channel thereupon immediately terminates its operation in respect to the LOCATE CCW, recognizes that the LOCATE CCW contains a "command chaining" bit, and proceeds to retrieve the next command. As previously indicated, the next command is always a READ or WRITE CCW. Upon retrieving the READ or WRITE CCW the channel re-establishes its interlocked signalling connection with the control unit 15.1 (e.g. via a selection signal sequence followed by a command out signal sequence).

While the channel is retrieving the READ or WRITE CCW and preparing for the associated selection communication with the control unit, the control unit operates to verify the LOCATE parameters and, in a "lookahead" mode which is described in greater detail later in this description, the control unit pre-calculates a "roll mode" displacement factor associated with a position in the page area designated in the LOCATE CCW which is anticipated to be potentially accessible with minimal latency when the transfer operation is (subsequently) fully prepared. This calculation is predicated on an assumption—which, in a minority of instances, may prove to be erroneous when the system is properly loaded—that the channel will not encounter any unanticipated interference in obtaining access to main storage (for its retrieval of the READ or WRITE CCW and for its retrieval of initial bytes of data if the transfer is to be a WRITE). This displacement factor is calculated in relation to the current time position of an initial byte element of the designated object page space in paging storage. This reference time position is effectively monitored by timing circuits in the control unit as described below.

A number corresponding to the pre-calculated displacement is stored in the control unit, and upon a command signal from the channel in association with the execution of the READ or WRITE CCW the control unit conditionally transfers a representation of this number to the channel. In respect to such conditional transfer the control unit first determines whether or not the command signal from the channel has been received within a predetermined time limit established by the control unit and conditions said transfer on this determination. If the command signal arrives within the set time limit the precalculated number is immediately transmitted to the channel. If the command signal arrives after the set time limit the control unit delays its response to the channel, calculates a new displacement factor and transmits that factor to the channel.

The channel adds whichever displacement factor it receives (i.e. pre-calculated or re-calculated) to the Data address specified in the Data Address field of the READ or WRITE CCW to form the address relative to main storage for initiating the data transfer.

The address in the Data Address field defines an initial byte location in an unfragmented 4,096-byte storage area in main storage. The channel and control unit then proceed shortly thereafter to transfer data bytes one by one relative to consecutive address locations in the paging store, starting at the page position associated with the displacement factor.

In association with such transfers the channel transfers groups of 64 data bytes relative to successive groups of 64-byte locations in main storage. As each group is transferred the address used by the channel to define the transfer location in main storage, which is a 24-bit (3-byte) quantity, is incremented by 64 (addition of 1 in the 7th lowest order bit position of the address term). Contemporaneously, a "remaining byte count" parameter is decremented by 64 as each group is transferred. The remaining byte count parameter is set initially to the value 4,096 (i.e. a page length) in accordance with information in the Count field of the READ or WRITE CCW. When the incremented address corresponds to an upper boundary of the page storage area currently being accessed the next incrementing operation is omitted and the address term is modified by a simple "zeroes for any" operation (in the 6 lowest order bit positions) to represent the address of the lower boundary of the page storage area currently being accessed. Accordingly, at this time the "updated" address will correspond to the address value specified in the Data Address field of the READ or WRITE CCW. The transfer then continues relative to this initial address location and successive locations, and is concluded when the channel detects that the value of the updated (decremented) remaining byte count has become 0; i.e. when a full page has been transferred.

The foregoing channel operations, i.e. the incrementing of the main store address parameter and the decrementing of the remaining byte count parameter, are conventional channel functions described in the previously cited Amdahl et al and King et al patent references. Accordingly, it will be understood that the only channel operations which represent a departure from conventional procedures are the reception of the displacement factor from the control unit, the addition of the displacement factor to the Data Address specified in the CCW, and the "wrapping" operation for linking the upper limit address consecutively to the lower limit address (of the same page). Furthermore the only control unit operations which represent a departure from conventional control unit procedures—and which represent an important feature of the present invention—are those operations, overlapped with the channel command chaining operation, which pertain to the speeding up of access to the paging store. Such operations include the calculation of the displacement factor and the communication of said factor to the channel.

Figure 4:
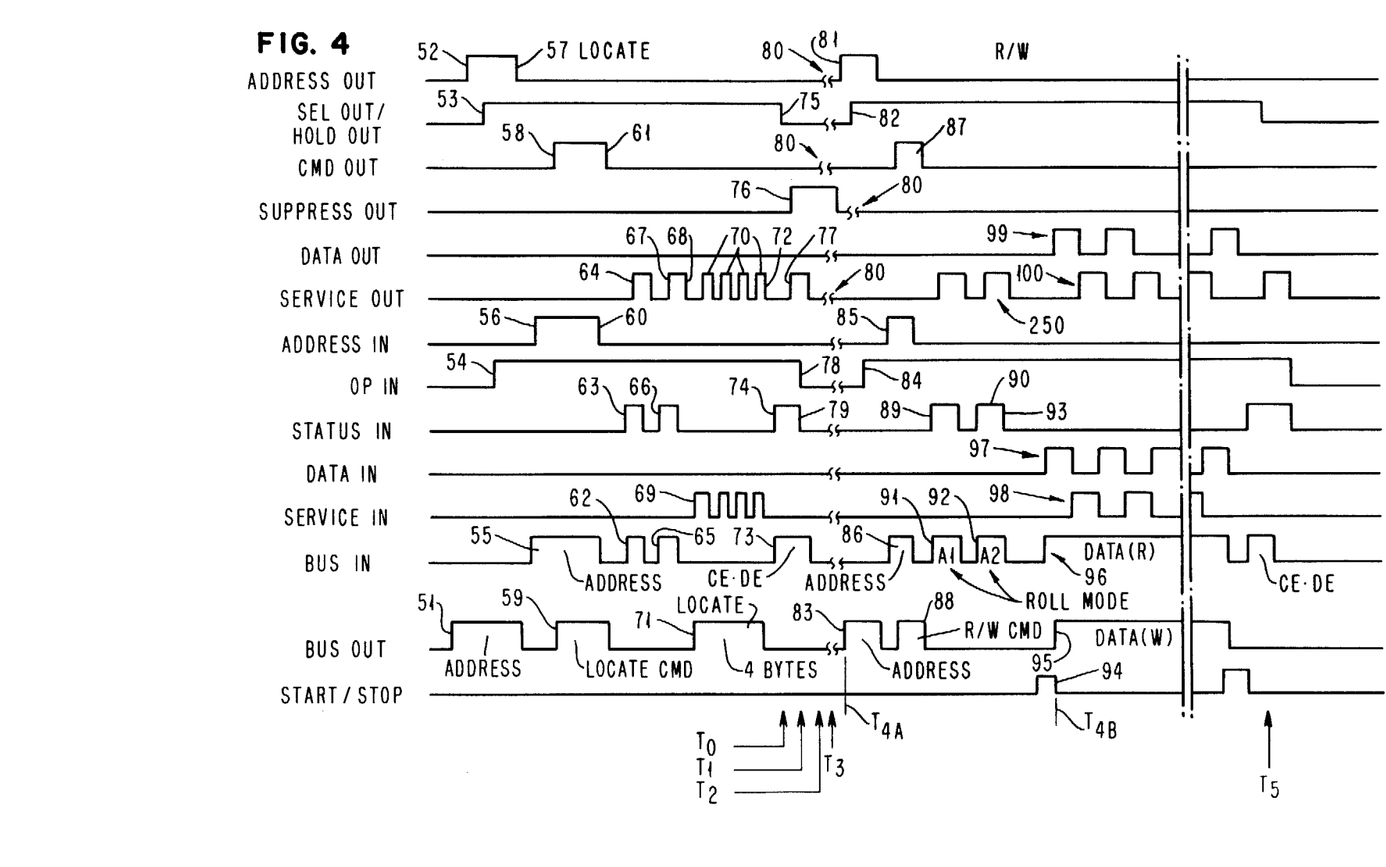
FIG. 4 is a timing chart illustrating aspects of I/O interface signalling associated with the practice of the present invention in the system environment exemplified in FIGS. 1-3.

FIG. 4 illustrates interface signal sequences, relative to the interface bus configuration of FIG. 2 and the channel-control unit configuration of FIG. 3, for accomplishing the foregoing novel transfers of control information (i.e. of control term information, in association with a LOCATE CCW, and of displacement factor information in association with a paired READ or WRITE CCW).

While processing a LOCATE CCW the channel 14.1 places the address of the exclusively associated paging store device 15.2 on Bus Out, as suggested at 51. Concurrently the channel presents an associated tag signal on the Address Out line as suggested at 52. Shortly thereafter the channel issues a selection control signal on the Select Out line as suggested at 53. Control unit 15.1, being the only control unit connected to this channel, recognizes its selection, verifies the address, and responds by raising Operational In as suggested at 54. Thereafter, the control unit presents the associated device address on Bus In (see 55), in conjunction with the tag signal on Address In (see 56), for validation by the channel.

In response to Operational In the channel terminates Address Out (see 57), and receives and verifies the validation address on Bus In. Assuming that the operation is satisfactory to this point the channel signals Command Out (see 58), and presents the control term parameter designated by the LOCATE command on Bus Out (see 59) in association with the Command Out signal. Those skilled in the art will recognize that prior to this time the channel will have fetched and interpreted the LOCATE command, and it also will have fetched and prepared (i.e. buffered) the associated control term.

The control unit thereupon receives the control term information and terminates Address In (see 60), enabling the channel to terminate Command Out (see 61). Next, the control unit places 2 bytes of information on Bus In in association with tag signals on Status In. The first of these bytes (see 62, 63) indicates that the following byte represents status information, as distinguished from displacement factor information. The second byte (see 65, 66) indicates whether the control unit is or is not busy; e.g. is or is not currently occupied by communications with another channel. Each of these bytes is accepted by the channel and acknowledged with a Service Out signal (see 64, 67).

The second Service Out response (see 67) indicates that the status is satisfactory for normal continuation of the operation. At the fall of this Service Out (see 68) the control unit raises Service In (see 69) causing the channel to respond with a sequence of four Service Out signals (see 70) in association with transfers of the four bytes of the "locate" control term on Bus Out (see 71). As previously indicated three of the four bytes of this control term define an object page space in paging store 15.2 and one byte of said term defines the direction of an anticipated transfer.

The control unit stores the control term, in preparation for calculating the displacement factor as described later, and upon the fall of the last Service Out (see 72) the control unit signals conclusion of the LOCATE operation, by presenting "device end" (DE) and "channel end" (CE) status signals on Bus In (see 73) in association with Status In (see 74). It should be understood that although the control unit has signalled the conclusion of the operation it still has other functions to perform in respect to that operation. Accordingly, the control unit proceeds to check the validity of the control term information, and calculate a displacement factor, while the channel terminates Hold Out (see 75) in association with its reception of ending status (see 73 and 74).

The control unit uses the fall of Hold Out as a reference point in time for its calculation of the roll mode displacement. The details of this calculation will be described later.

The rise of Status In (see 74) also conditions the channel to recognize the chaining bit of the LOCATE CCW and to raise Suppress Out (see 76) and Service Out (see 77) in association with such recognition. The coincident manifestation of Suppress Out and Service Out, which serves as a conventional indication to the control unit that the channel is preparing for command chaining, causes the control unit to terminate Operational In (see 78) and Status In (see 79).

After a variable duration of time suggested by breaks at 80—during which the channel retrieves a READ or WRITE CCW from main store 10 and prepares for chained operation, while the control unit concurrently pre-calculates a roll mode displacement factor for minimized latency access to the required page storage area in store 15.2—the channel reselects the control unit with Address Out (see 81), Select Out (see 82) and address information on Bus Out (see 83). The control unit responds in a conventional sense with Operational In (see 84) and Address In (see 85) in association with a validation address on Bus In (see 86). The channel follows with Command Out (see 87) and a read or write command signal on Bus Out (see 88). After an indeterminate delay (to be explained) the control unit follows, in a novel context in accordance with the present invention, with a sequence of two Status In signals (see 89 and 90) in association with a transfer of two bytes of information on Bus In (see 91 and 92). These two bytes represent a roll mode displacement factor calculated by the control unit. This transaction must be completed before any page data is exchanged.

After the last fall of Status In (see 93) and another interval of indeterminate duration (to be explained) a "start" signal denoting accessibility of the roll mode position (see 94) is developed in the control unit. If the control unit has been appropriately reselected by the channel, in association with a READ or WRITE CCW, the bytes of a page of data are transferred; either on Bus Out if the operation is a WRITE (see 95) or on Bus In if the operation is a READ (see 96). If the operation is a WRITE each byte of data is requested by either a Data In or Service In signal (see 97, 98), and sent in association with a Data Out or Service Out signal (see 99, 100). If the operation is a READ each byte of data is sent to the channel with either a Data In or Service In signal, and acknowledged by the channel with either a Data Out or Service Out signal.

Figure 5:
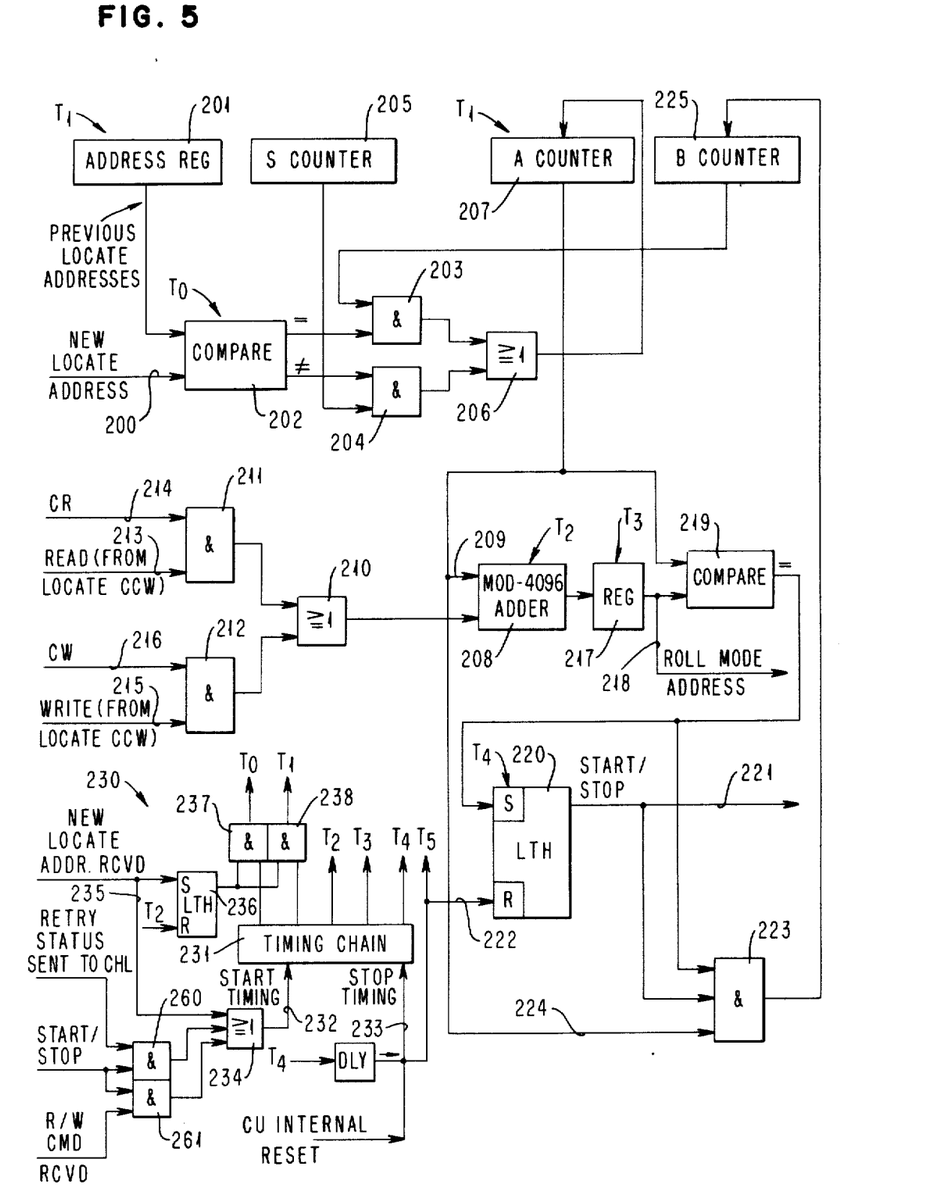
FIG. 5 schematically illustrates control unit logic for pre-calculating a roll mode displacement address, in accordance with the present invention, relative to an exemplary paging store organization illustrated schematically in FIG. 6.
Figure 6:
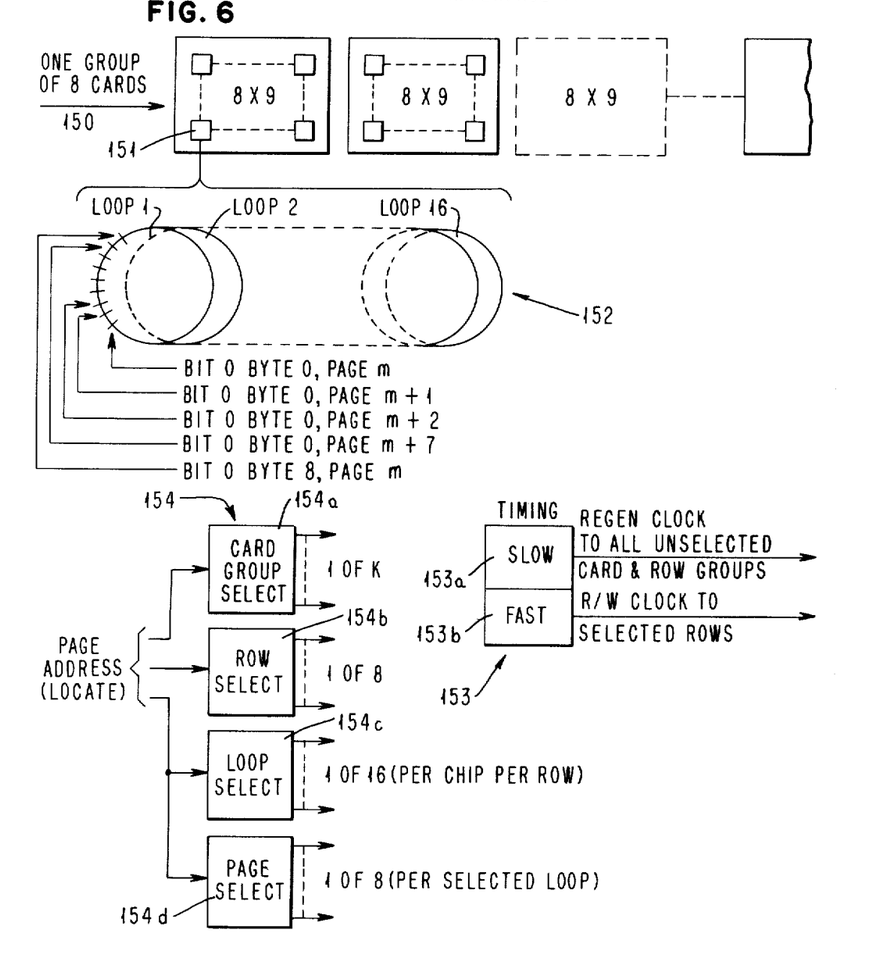

FIG. 5 illustrates control unit logic for calculating a roll mode displacement factor relative to an exemplary paging store organization schematically shown in FIG. 6. This exemplary store comprises a plurality of CCD storage array chips organized into dynamic shift register loops such that the bits of a group of successive bytes in a page are accessible in parallel, and so that successive groups of bytes in a page are accessible sequentially, at a predetermined rate and on a cyclic basis. Accordingly, the first byte of each page (byte 0) would be accessible sequentially after the last byte of the same page (byte 4,095). This store is organized for interleaved storage of correspondingly ordered bits of multiple different pages so that, in effect, the pages interleaved on a common group of loops would be accessible on a random access basis with a slight time offset; although individual bytes in any page would be accessible only on a cyclic basis. This store is organized for slow regeneration clocking of unselected page groups and fast read/write clocking of selected page groups.

As suggested in FIG. 6 the exemplary store may be organized into multiple groups of cards, each group consisting of eight cards. One such group of cards is shown at 150. Each card contains a rectangular array of 72 chips arranged in 8 rows by 9 columns. Each chip, such as 151, contains multiple CCD bit storage circuits arranged for access in sixteen separate dynamic shift register loops, as suggested at 152. Each loop can store 4,096 bits. As suggested in respect to Loop 1 each loop is arranged to store 512 bits of eight different pages (in loop 1 the first bits—bits 0—in the first 512 bytes—bytes 0 through 511—in each of 8 pages; pages m through m+7), and the 16 loops in aggregate can store 512 bits in each of 128 different pages (loop 2 storing 512 bits in each of 8 pages m+8 through m+15, loop 3 storing 512 bits in each of 8 pages m+16 through m+23, etc.)

Corresponding bit positions in corresponding loops in each of the nine chips in a single row of a card row group are arranged to store the eight bits of one byte of a page, plus a parity check bit, for parallel access. Accordingly the chips in one chip row of a card row group can store 512 bytes of 128 different pages in an interleaved configuration.

Corresponding chip rows in the eight cards of a card group are associated for storage of different bytes of corresponding pages whereby the chips in the eight chip rows of a card group in combination can store 4,096 bytes (i.e. 8×512) in each of 128 different pages; i.e. all of the bytes in 128 different pages.

Successive bytes of a page are stored in corresponding chip row and loop positions on successive cards of a card group. The clock timing for accessing individual byte locations in such 8-byte groups is time staggered so that the successive bytes in each group of eight bytes are rendered consecutively accessible just before the next group of eight bytes in the same page become accessible.

As suggested at 153 in FIG. 6 the store receives clock timing pulse signals at two different rates; a slow rate from a clock source 153a and a fast rate from a clock source 153b. The fast rate clock pulses are applied to a selected card row of a card group for timing the transfer of data to or from a loop and the time position of data within the selected row. The slow rate clock pulses are applied to all unselected card groups for timing the regeneration of the storage conditions in the unselected card groups. After a page has been read or written a counter (described later) which tracks loop positions in the selected row must be stepped in a "catch-up" mode by the fast clock pulses until it is phased synchronized with a counter defining the loop ("regeneration") position in unselected cards. This complicates the calculation of the displacement factor as will be seen below.

As indicated at 154 groups of bits within the page address portion of the LOCATE control term are decoded at 154a to define a card group, at 154b to define one of eight rows within that group, at 154c to define one of 16 loops within each chip of that row, and at 154d to define one of 8 page time positions within each loop designated at 154c.

FIG. 5 illustrates the logic in the control unit for calculation of the displacement factor. Lines 200 receive the card and row designating portions of the newly transferred LOCATE control term (refer to 71 in FIG. 4). Register 201 holds corresponding address information associated with the last previously accessed page storage area. A timing chain described later produces timing pulse functions T0-T4 (see bottom of FIG. 4) referenced in time to the reception of the LOCATE control term. At T0 comparison logic circuits 202 compare the new LOCATE address on lines 200 with the previous LOCATE address in register 201. If a match is detected—meaning that the card row containing the newly designated page storage area is the same as the card row containing the last previously accessed page storage area—an "equal" output is generated by circuits 202, preparing AND gate circuits 203. If the compared values are unequal—meaning that the newly specified page area which is located in a different card row—the circuits 202 produce a "not equal" output which prepares AND gate circuits 204.

S ("slow") counter 205 is stepped by slow clock pulses from timing source 153a (FIG. 6), and thereby defines page time positions within those "idle" card rows which are being regenerated. The output of this S counter is applied to the gate circuits 204, and thereby passed by said circuits to OR gate circuits 206 when the "not equal" output condition is generated by comparison circuits 202. At time T1 (see bottom of FIG. 4) the information passed by OR gates 206 is set into "A" counter 207 augmented by a low order factor associated with the interleaved position of the newly designated page.

The "A" counter is continually stepped by fast clock pulses from source 153b (FIG. 6), and at this time it begins tracking positions within the newly designated page. At the same time T1 the clock pulses from source 153b are applied to the chip row in the card group designated by the information last received on lines 200, so that these cards now cycle at the fast rate associated with source 153b. Also, at T1, the new LOCATE address on lines 200 is entered into register 201.

Subsequently, at time T2 (refer to bottom of FIG. 4), adder 208 receives both the current numerical value of "A" counter 207, via lines 209, and one of two constant numbers described below, and forms the sum (modulo 4,096) of these two numbers. The result includes digits which represent the roll mode displacement factor discussed previously.

The constant number chosen to be added to the sampled "A" count is passed to the adder 208 via OR gate circuits 210, and one of two AND gate circuits 211 or 212. If a READ operation is specified by the newly received LOCATE control term gates 211 are prepared via a signal on line 213, and transfer a representation of a "read" constant function CR received via lines 214. If a WRITE operation is specified gates 212 are prepared by a signal on line 215 and transfer a representation of an associated "write" constant CW received via lines 216. The constant CR is a function of the minimal time required by the channel to complete a single access to main store 10 (FIG. 1), to fetch a READ CCW, and to then prepare a control unit selection operation associated with that CCW. The constant CW is a function of the minimal time required by the channel to retrieve a WRITE CCW, then prepare an associated control unit selection, then re-access main store and prepare an initial group of data bytes, in channel buffers, in preparation for a subsequent data transfer to the control unit. The minimal time required by the channel to access main store is the time required when the channel does not encounter any appreciable delays due to contention with other channels or due to other causes such as a storage malfunction.

At T3 the result produced by adder 208 is latched in register 217, a portion of said result thereby becoming available on lines 218 for transfer to the channel as the "roll mode" displacement factor. The full output of register 217, which represents a time/byte position within a selected page, is compared to the state of "A" counter 207 in compare circuits 219. As previously indicated after T1 the "A" counter tracks byte time positions within the newly specified page. When a comparison match is detected circuits 219 set latch 220. In set state latch 220 provides a "Start/Stop" signal on line 221 (refer to 94 in FIG. 4). This signal partially conditions the control unit to start the transfer of data relative to the channel. Subsequently, latch 220 is reset by a signal T5 on line 222.

The set output of latch 220 and the match output of compare circuit 219 are also applied to AND gate circuits 223. Although latch 220 is set initially too late in time to prepare gates 223, the latch remains set for sufficient time to enable the "A" counter to step through a full counting cycle; whereby the match output of circuit 219 is repeated while the set output of latch 220 has remained up. This enables AND gates 223 to pass the "matching" "A" count value, which the gates receive via lines 224, to "B" counter 225. B counter 225 is continually stepped by the pulses from fast counter 153b (FIG. 6) until the data transfer operation is completed. Accordingly, from this time forward the B and A counters contain identical values and step in synchronism. This permits the "B" counter to continue tracking the cycling of a selected row in a card group, after a page transfer, has been concluded and while the selected group has "caught up" to other groups cycling at the slow rate; whereby the "A" counter is immediately free to prepare for another transfer when a current transfer concludes.

If the READ or WRITE command signal (R/W cmd) is received sufficiently early in time relative to the activation of the Start/Stop signal, not-shown circuits in the control unit operate to transfer the displacement factor from lines 218 to the channel via Bus In (see 91, 92, FIG. 4) and to exchange a page of data with the channel interface as previously described. If the R/W cmd signal is received too late in time, to start the data transfer without a re-cycling of the designated page, the control unit operates in one of two modes to re-calculate a displacement factor and to start the transfer on a delayed basis.

In one mode the control unit logic recognizes late reception of the R/W cmd signal before it has sent the pre-calculated displacement factor to the channel (from register 218), and merely delays its signals to the channel while it re-calculates a suitable new displacement factor. This new factor is then passed to the channel. As viewed by the channel this operation proceeds "normally" without any hiatus. In the other mode the control unit recognizes late reception of the R/W cmd signal after it has sent the displacement factor to the channel. In this mode the control unit invokes a command retry operation in accordance with the teachings of U.S. Pat. No. 3,688,274 issued Aug. 29, 1972 to R. L. Cormier et al, entitled "Command Retry Control By Peripheral Devices", which is assigned to the assignee of the present application. In such operation the control unit transmits unit check (UC) and status modifier (SM) signals in association with concluding status signals (CE, DE), and the channel responds by refetching the last executed CCW (i.e. the READ or WRITE CCW) and re-executing the associated command function.

The logic for generating the signals T0-T5 is indicated at 230 in FIG. 5. Such logic includes a "timing chain" circuit 231 which can be asynchronously started into operation by signals on line 232 and reset to an idle state by T5 signals on line 233. When started the circuit 231 operates as a counter and is stepped by not-shown clock pulses through discrete states including states associated with T0-T4. The signal to start is transferred to line 232, from one of several sources, via OR circuit 234.

In the normal sequence of transfer operation the start signal is received via line 235 and represents the time of reception of a new LOCATE address (see 71 FIG. 4) as manifested by the set state transition of a not-shown latch. The same signal sets a latch 236 which is reset at T2. The set state of latch 236 prepares AND circuits 237 and 238 for allowing signals T0 and T1 to be issued during the subsequent stepping of timing circuit 231. The reason for this will be made clear below.

After activation of line 235 signals T0-T4 are produced sequentially, at predetermined times relative to said activation, and control the normal operation of the other circuits in FIG. 5. Accordingly, at T0 circuit 202 prepares gates 203 or gates 204 to respectively pass the instantaneous value of the B counter 225 or S counter 205 to the A counter 207. As indicated previously the B counter tracks page positions in the last previously selected card row during a previous transfer and a catch-up period of operation. Thereafter, the B counter is set to the S count value and switched to receive stepping pulses from the slow clock source 153a which steps the S counter, and the previously selected card row is clocked at the slow rate (for regeneration). Accordingly, if the circuit 202 detects equality (meaning that the previously selected card row is being reselected) the B counter value is transferred to counter 207 (which continues to step at the fast rate), and the selected card row is immediately coupled to the fast clock source 153b, whereby the A counter thereafter advances in synchronism with the selected row. On the other hand if circuit 202 detects inequality (meaning that a different row is being selected) the S counter position, associated with the slow regeneration cycling position of the newly addressed row, is transferred to the A counter and thereafter the A counter and the newly addressed row are cycled in synchronism at the fast rate. Then at T2, adder 208 generates the roll mode address containing the displacement factor, which at T3 is stored in register 217. At T4 latch 220 is set, thereby generating a reference signal on Start/Stop line 221 for determining the timeliness of the reception of the R/W cmd signal from the channel. If the R/W cmd signal is received before this reference signal not-shown circuits in the control unit transfer the displacement factor to the channel. If the control unit thereafter determines that the R/W cmd reception was too late (i.e. if the reference occurs before the transfer of the displacement address has been fully acknowledged by Service Out signals from the channel as shown at 250, FIG. 4) the control unit invokes the command retry operation as previously described. Otherwise the data transfer operation is carried out on a normal basis. If the control unit recognizes a "very late" R/W cmd signal (i.e. one coinciding with or later than the start timing reference) the control unit merely delays its transfer of the displacement factor, calculates a new factor and transfers the new factor to the channel for initiating the data transfer on a "transparently" delayed basis.

In either case above, of late reception of the R/W cmd, the control unit must operate adder 208 and register 217 to prepare a new displacement factor. In the "retry" case, where the R/W cmd is received after the transfer of displacement factor has started the point in time at which the control unit signals retry status is used to operate AND circuit 260 and OR circuit 234, and thereby restart the timing chain 231. During this operation of chain 231 latch 236 remains reset thereby disabling gates 237 and 238 from issuing T0 and T1. Accordingly the count initiation functions of circuits 202-204 and 206 are skipped (since the A counter and specified row are already in synchronism), and only the functions associated with adder 208, register 217 and compare 219 are repeated (in time reference to the transfer of retry status, and while the channel re-prepares the CCW and re-executes the R/W cmd signal transfer).

In the "very late" case, above, the reception of the R/W cmd signal in coincidence with or after the occurrence of the start reference is used as a reference point in time for operating AND gate 261 and OR circuit 234 to start operation of chain 231. Here, again gates 237 and 238 suppress T0 and T1, and circuits 208 and 217 operate to prepare a new displacement factor which is sent to the channel on a delayed basis (relative to the reception of the R/W cmd signal).

Figure 7:
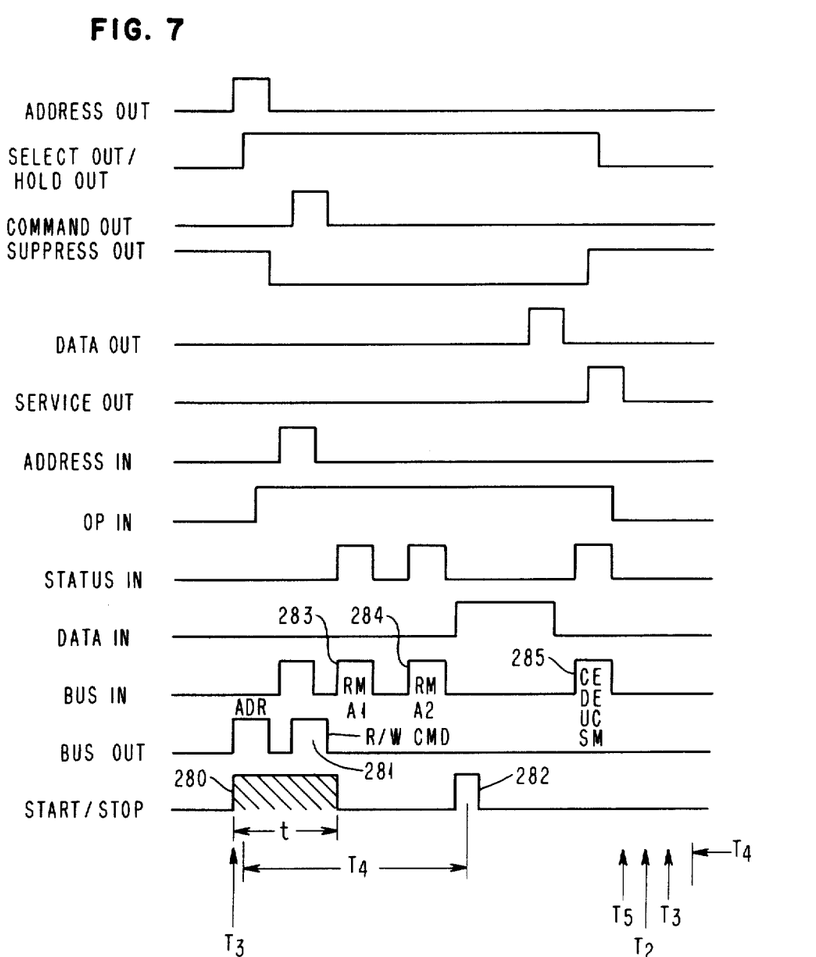
FIG. 7 is a timing chart illustrating other aspects of I/O interface signalling in accordance with the present invention.

The timing in the foregoing "retry" and "very late" cases is shown in FIG. 7. In the very late case the start reference occurs in the shaded interval 280, while the R/W cmd signal is being received as suggested at 281, and before the transfer of any displacement factor information. In the retry case the start reference occurs as shown at 282 during or after transfers of the displacement factor bytes indicated at 283 and 284; causing the control unit to present retry status to the channel at 285 (CE, DE, with UC, and SM).

Figure 8:
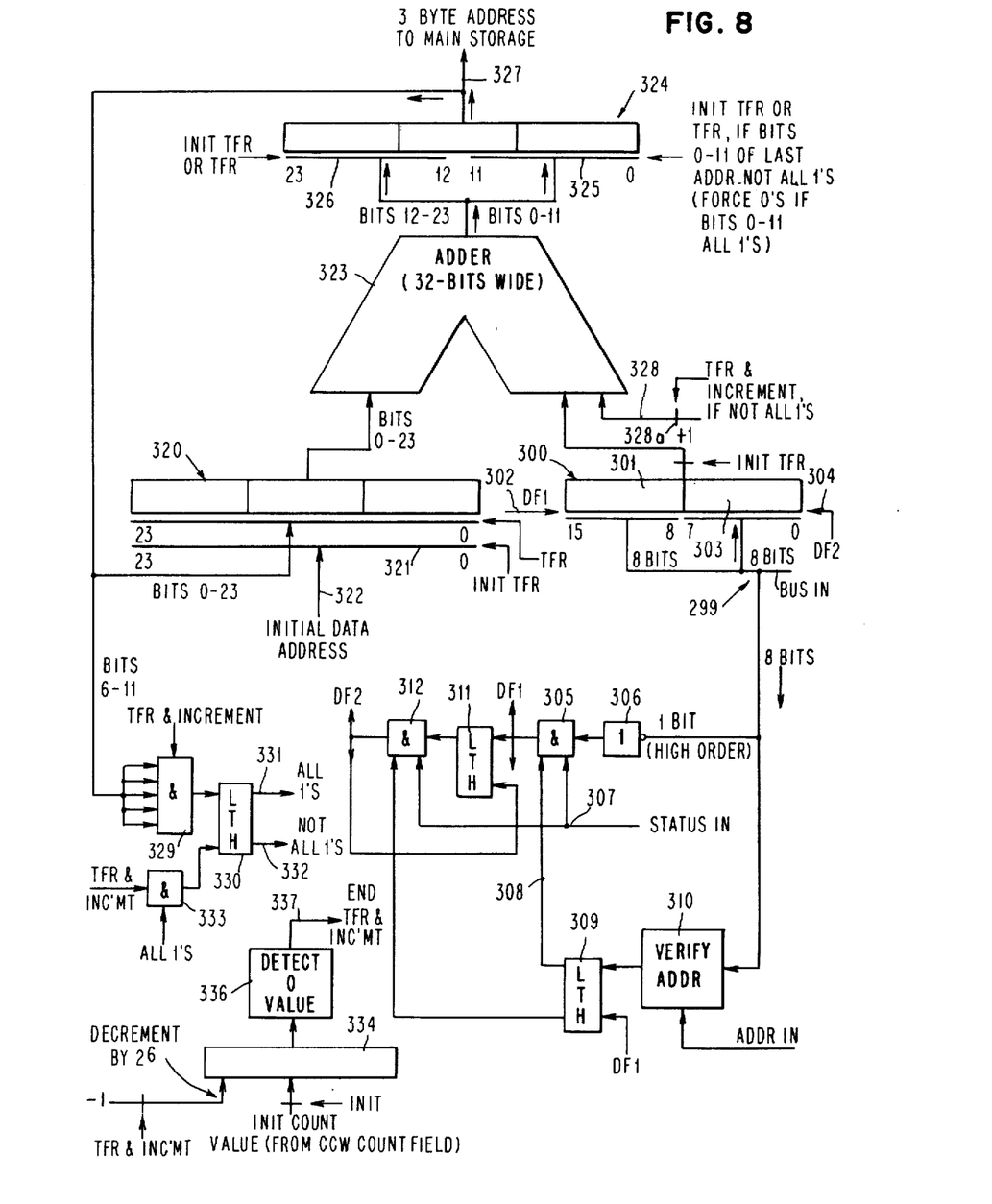
FIG. 8 schematically illustrates channel logic for adding the displacement factor supplied by the control unit to the data address value specified in the currently effective CCW, for incrementing the resulting address value as data is transferred relative to main storage, for determining when the updated address value represents a storage position one unit of incrementation removed from the lower bound of the page storage area next to the area currently being accessed, and for modifying the address value after the next data transfer to designate the lower boundary of the area currently being accessed.

FIG. 8 schematically illustrates channel logic for receiving and utilizing the roll mode displacement factor generated by the control unit. The displacement factor is a 2-byte number, received one byte at a time on Bus In (see 91, 92, FIG. 4), accompanied by Status In tag signals (see 89, 90 FIG. 4). The high order byte is received first and has the form: fxxxbbbb, where the "b" bits are 1's and 0's representing significant high order bits of the displacement factor number, the "x" bits represent non-significant ("don't care") bits and the "f" bit is a flag distinguishing the displacement factor from "status" information transferred in this manner (see 62, 65 FIG. 4). When displacement factor information is transferred the "f" bit value is 0, whereas when status information is transferred the same bit has the value 1. The low order byte of the displacement factor has the form: bb000000, where the six lowest order bits are always 0's (because the channel, as explained later, always exchanges data with main storage in groups of 64 bytes, and therefore all addresses to main storage for such transfers define 64 byte boundaries) and the "b" bits have variable 1 and 0 values.

The displacement factor bytes are received on Bus In at 299 and inserted into byte sections of a register 300. Although shown as having only two byte sections, this register obviously could have other sections; and if it does such other sections would be set to all 0's. The high order byte of the displacement factor is stored into the lefthand high order section 301 of register 300 under control of a displacement factor gating signal DF1 applied at 302. The low order byte of the displacement factor is inserted into the lowest order byte section 303 of register 300 under control of a gating signal DF2 applied at 304.

Gating signal DF1 is produced by AND gate 305 in response to signals received concurrently from inverter 306, Status In line 307 and "set" output 308 of set/reset latch 309. Inverter 306 receives its input from the highest order bit line 310 of Bus In and inverts the bit signal appearing on that line. Latch 309 is set prior to the transfer of the displacement factor, when the paging store address is received on Bus In accompanied by Address In (see 86, 85 FIG. 4), and recognized by circuits 310. Since a 0 high order bit on Bus In will coincide with activation of Status In (following address recognition) only when the high order byte of the displacement factor is being transferred, AND gate 305 will transfer a DF1 signal only when that byte is being transferred. In addition to gating the input to register section 301, DF1 sets latch 311 and resets latch 309. In set condition latch 311 prepares AND gate 312 which is responsible for generating gating signal DF2. Gate 312 operates in response to the concurrence of set condition of latch 311, reset condition of latch 309 and activation of Status In. Accordingly, DF2 coincides with the arrival of the second (lowest order) byte of the displacement factor. In addition to gating the low order byte of the displacement factor into register section 303, DF2 resets latch 311.

When the displacement factor has been loaded into register 300 an "initial" 3-byte (24-bit) data address value is transferred into a register 320 via gates suggested at 321 and bus lines suggested at 322. This initial value, which corresponds to the previously described "data address" term of the new (most recently retrieved) CCW, has the form (in the order of decreasing byte significance): bbbbbbbb bbbb0000 00000000; wherein the 12 lowest order bits are required always to be all 0's in order to define the address of an easily identifiable boundary of a page storage area of 4,096 (i.e. $2^{12}$) bytes in main storage, as suggested previously. The 12 high order bits "b" may have 1 and 0 values in any configuration.

When both registers 300 and 320 have been loaded, respectively with displacement factor and initial address values, adder 323 is operated to produce the sum of these values. Many, if not all, contemporary channels contain or have access to an adder capable of performing this function. The result output of adder 323 is entered into register 324 via gates suggested at 325 and 326. Gates 325 transfer the 12 lowest order bits of the result and gates 326 transfer the 12 higher order bits of the result into respective 12-bit sections of register 324. Gates 325 and 326 are both enabled for this particular transfer and for other transfers of information between adder 323 and register 324. However, under certain conditions described below, gates 325 are disabled to effectively force all 0's into the low order section of register 324.

The result value in register 324 is subsequently transferred into register 320. For the sake of efficiency the channel presently under consideration should be adapted to exchange data with main storage on a byte-parallel basis; preferably in groups of multiple bytes. In the illustrated embodiment it is assumed that such transfers are conducted relative to groups of 64 bytes. Accordingly, when the first group of 64 bytes of data has been received from the control unit on a READ command operation, and assembled in not-shown channel data buffers, or when the channel is ready to receive the first group of 64 bytes of data from main storage on a WRITE command operation, the augmented address value stored in register 320 is circulated through adder 323 and register 324 without modification, presented to the addressing controls of main storage via bus 327 and returned to register 320. The address on bus 327 is then used to locate a 64-byte area in main storage for fetching or storing the first group of 64 data bytes.

After this first group of data bytes has been transferred the value in register 320 is again circulated through adder 323 while increment line 328 on the right side input of the adder is activated by operation of gate 328a. With line 328 activated an increment of 1 is added into the 7th lowest order bit position of the adder, effectively causing the address received from register 320 to be increased in value by $2^6$ (i.e. 64), and the incremented result address is stored in register 320.

The foregoing process is repeated as successive groups of 64 data bytes are transferred to or from main storage, and in association with each group transfer an incrementing operation is performed by activation of AND gate 328a. In association with each such address incrementing operation bits 6-11 of the result address (i.e. the six highest order bits of the 12 lowest order bits) are examined by AND circuit 329. If these six bits are not all 1's no action is taken. However, if these bits are all 1's latch 330 is set, thereby activating its "all 1's" output 331 and de-activating its "not all 1's" output 332. Since the "not all 1's" output is an "and" factor in the enablements of gates 325 and 328a, on a subsequent incrementing transfer through adder 323 (transfer with excitation of AND gate 328a), the incrementing operation relative to the 7th lowest order bit will be suppressed, 0's will be forced into the 12 lowest order positions of the result address entry in register 324, and latch 330 will be reset by operation of AND gate 333. As a consequence of these operations when the address value defines the location of the 64-byte storage area adjacent to the upper boundary of the page storage area currently being accessed (address bits 6–11 all 1's) the address value will be modified at the next incrementing operation to define the location of the 64-byte storage area at the lower address boundary of the currently accessed page storage area (i.e. the 12 lowest order bits will be set to all 0's without altering the 12 highest order bits). This "wrapping" of the addressing sequence, to step the address from the upper boundary limit in a page storage area to the lower boundary limit in the same area, is thereby accomplished automatically regardless of the displacement factor value.

In association with each address incrementing operation the channel operates to decrement a count word stored in register 334 in increments of $2^6$ (i.e. 64). This count word represents the number of bytes transferred relative to main storage, and has an initial value corresponding to the value in the count field of the currently effective CCW. As explained previously for page store transfers this initial value is always 4,096. When the decremented count value is 0 circuit 336 detects this value (as an indication that a complete page has been transferred) and produces a signal on line 337 to end the transfer and incrementing phase of the operation (i.e. conclude data transfers relative to main storage).

Those skilled in the art will recognize that many channels are organized for microprogrammed operation. In respect to such channels it will be appreciated that the operations of many of the logical elements shown in FIG. 8—including those of elements 302, 304–312, 328a, 329, 330, 333, 336, and the controls over the gating of inputs to registers 320 and 324—could be implemented by straightforward microprogramming procedures. However, it should be understood that these elements and their specific form of implementation are not per se considered to be part of the present invention. Furthermore, it will be understood by those skilled in the art that the functions associated with "wrapped linkage" of the upper boundary data address to the lower boundary data address—i.e. the functions disclosed above of detecting all 1's in the 12 lowest order bits of the updated data address value, suppressing the following incrementing function at 328a and forcing 0's into the 12 lowest order bits of the circulated data address function—could easily be performed by other expedients; for instance, by detecting all 1's in the 12 lowest order bits and inhibiting the associated carry into the 13th bit position during the following incrementing operation (although this would require internal modification of adder 323). However, it is noted that the particulars of this address wrapping procedure are not per se considered to be any part of the present invention and are not claimed as such.

Accordingly the method and apparatus, by which the foregoing and other novel attributes of the present invention are achieved, are claimed in the following claims.

Having thus described my invention, what I claim as new, and desire to secure by Letters Patent is:

1. In a data processing system having a CPU, a main storage, a channel attached to said CPU and main storage, a control unit, a general purpose I/O interface bus interconnecting said control unit and said channel, and a storage device having rotational latency attached to said control unit, whereby it is advantageous to transfer data on said bus in roll mode, in which the data transfer is started and concluded at a variably determined position whithin a page block of said device, wherein said channel and control unit include means for operating under control of a first programmed channel command providing control information to locate a page storage area in said device and to define the direction of a data transfer operation scheduled to be performed subsequently between said page area of said device and a corresponding unfragmented page storage area of said main storage and for operating under control of a second programmed channel command chained to said first command for locating said corresponding unfragmented page storage area in said main storage, and wherein said channel and control unit include means for controlling the transfer of a multi-byte page block of data between said page area in said device and said corresponding page storage area in main storage, an improvement for speeding up access to said device, comprising:

first means in said control unit responsive to channel signals produced during execution of a said first command for determination in advance of the preparation of an associated second command a minimal latency entry position in a page storage area in said device designated by said channel signals for a data transfer in roll mode;

said determination being conditioned on a constant time factor K associated in part with an estimate of the time required by said channel to retrieve said second command from main storage and conditioned in part by the cycling rate and the rotational position of said storage device device and the direction of said transfer; and second means for passing a signal from said control unit to said channel representing said entry position in response to a signal from said channel indicating a said second command, whereby the data transfer begins at said position of minimal latency if said channel executes said second programmed command within said estimate of the time required.

2. In a system in accordance with claim 1 wherein said channel is potentially subject to having to contend with other channels for access to main storage, the improvement wherein:

said time estimate associated with said factor K is based upon an assumption that said channel will not encounter any excessive delays due to contention while it is chaining to said second command.

3. A system in accordance with claim 2, wherein said control unit comprises:

means responsive to an initial signal from said channel in association with execution of said second command for determining whether said initial signal is early or late in relation to the actual accessibility timing of said entry position;

means responsive to said early or late determination for producing a first signal if said initial signal is early and a second signal if said initial signal is late;

means responsive to said first signal for enabling said control unit to pass information representing said entry position to said channel; and means responsive to said second signal for enabling said control unit to compute a new entry position, and to pass information representative thereof to said channel, whereby said transfer of said page is initiated at said new position.

4. A method of transferring a page block of data between the main memory of a central data processing system and a cyclic access secondary paging store over an interconnecting general purpose I/O interface bus in a roll mode, in which mode the data transfer is started and concluded at a variably determined position within a page block, comprising:
   executing a first command in said central system providing control information defining a page storage area in said secondary system and the direction of a transfer operation scheduled to be performed subsequently in respect to said area,
   transferring corresponding control information to control apparatus associated with said secondary store;
   chaining said central system to a second command defining a page storage area in said main memory and specifying a data transfer operation between said page storage areas in said main memory and secondary store;
   calculating a roll mode displacement factor in said control apparatus in a predetermined overlapping time relation to operations in said central system associated with said chaining step;
   exchanging signals over said bus between said central system and said control apparatus for indicating completion of said chaining step to said control apparatus and the value of said calculated roll mode displacement factor to said central system; and
   transferring a page block of data between said page storage area in said main memory and secondary store, starting and concluding said operation at corresponding positions within said areas which are variably defined by said displacement factor.

5. A method in accordance with claim 4, for use in relation to a secondary store comprising storage elements which require intermittent regeneration, wherein said secondary store comprises elements grouped into plural sections, and wherein one section of said store may be cycled at a first clocking rate, for transferring data relative to said one section, while other sections of said store are being cycled at a second clocking rate and storage conditions in said other sections in said other sections are being regenerated, said first rate being different from said second rate, and wherein said store is organized to continue cycling a said one section at said first rate after a said transfer of data until said one section and other sections are in synchronism and thereafter to initiate cycling of said one section at said second rate for regeneration purposes, the improvement comprising:
   determining the current cycling position of a specific section of said secondary store containing a page storage area defined by said first command in predetermined overlapping time relation to chaining operations in said channels, and while said specific section may be cycling at either said first or second rate;
   at a predetermined time after said position determination, calculating a displacement factor by adding a selected one of two constants to information representing the current cycling position of said store; and, at the same time,
   conditioning said specific section for operation at said first rate immediately after said position determination;
   said selected constant being a function of the direction of transfer specified in said first command, an access time characteristic of said main memory, and said first rate.

* * * * *